United States Patent
Gupta et al.

(10) Patent No.: US 8,977,494 B2
(45) Date of Patent: Mar. 10, 2015

(54) METHOD AND APPARATUS FOR IDENTIFICATION OF POINTS OF INTEREST WITHIN A PREDEFINED AREA

(71) Applicant: QUALCOMM Incorporated, San Diego, CA (US)

(72) Inventors: Rajarshi Gupta, Sunnyvale, CA (US); Min-Wook Jeong, Stanford, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/249,269

(22) Filed: Apr. 9, 2014

(65) Prior Publication Data

US 2014/0222334 A1   Aug. 7, 2014

Related U.S. Application Data

(62) Division of application No. 12/901,304, filed on Oct. 8, 2010, now Pat. No. 8,756,010.

(60) Provisional application No. 61/250,862, filed on Oct. 12, 2009.

(51) Int. Cl.
*G01C 21/00* (2006.01)
*G01S 5/00* (2006.01)
*G01S 5/02* (2010.01)

(52) U.S. Cl.
CPC *G01S 5/0018* (2013.01); *G01S 5/02* (2013.01)
USPC .......................................................... 701/489

(58) Field of Classification Search
None
See application file for complete search history.

(56) References Cited

U.S. PATENT DOCUMENTS

| | | | |
|---|---|---|---|
| 7,881,862 B2 * | 2/2011 | Pei et al. | 701/432 |
| 7,928,840 B2 * | 4/2011 | Kim et al. | 340/531 |
| 8,180,379 B2 * | 5/2012 | Forstall et al. | 455/456.6 |
| 8,200,251 B2 * | 6/2012 | Huang | 455/457 |
| 8,213,389 B2 * | 7/2012 | Bush et al. | 370/334 |
| 8,340,694 B2 * | 12/2012 | Forstall et al. | 455/456.6 |
| 8,352,172 B2 * | 1/2013 | Pei et al. | 701/300 |
| 8,355,862 B2 * | 1/2013 | Matas et al. | 701/408 |
| 8,355,870 B2 | 1/2013 | Link, II et al. | |
| 8,359,643 B2 * | 1/2013 | Low et al. | 726/9 |

(Continued)

FOREIGN PATENT DOCUMENTS

| | | |
|---|---|---|
| GB | 2452734 A | 3/2009 |
| JP | 2003162718 A | 6/2003 |

(Continued)

OTHER PUBLICATIONS

Bilmes, "A Gentle Tutorial of the EM Algorithm and its Application to Parameter Estimation for Gaussian Mixture and Hidden Markov Models," International Computer Science Institute, Apr. 1998, pp. 1-13.

(Continued)

*Primary Examiner* — Thomas Tarcza
*Assistant Examiner* — Adam Alharbi
(74) *Attorney, Agent, or Firm* — Arnold J. Gum

(57) ABSTRACT

The subject matter disclosed herein relates to a system and method for identification of points of interest within a predefined area. Location estimates for substantially stationary mobile devices may be utilized to determine locations of one or more points of interest. Location estimates for mobile devices in motion may be utilized to determine locations of one or more corridors.

28 Claims, 12 Drawing Sheets

(56) References Cited

U.S. PATENT DOCUMENTS

| | | | |
|---|---|---|---|
| 8,369,837 B2* | 2/2013 | Huang et al. | 455/412.2 |
| 8,369,867 B2* | 2/2013 | Van Os et al. | 455/456.1 |
| 8,386,620 B2* | 2/2013 | Chatterjee | 709/228 |
| 8,396,485 B2* | 3/2013 | Grainger et al. | 455/456.1 |
| 8,400,292 B2* | 3/2013 | Kummetz | 340/517 |
| 8,433,334 B2* | 4/2013 | Huang et al. | 455/456.1 |
| 8,447,326 B2* | 5/2013 | Huang et al. | 455/456.1 |
| 8,489,127 B2* | 7/2013 | Huang et al. | 455/457 |
| 8,504,061 B2* | 8/2013 | Grainger et al. | 455/456.1 |
| 8,514,816 B2* | 8/2013 | Bush et al. | 370/334 |
| 8,538,462 B2* | 9/2013 | Forstall et al. | 455/456.3 |
| 8,620,344 B2* | 12/2013 | Huang et al. | 455/456.1 |
| 8,620,345 B2* | 12/2013 | Huang et al. | 455/456.1 |
| 8,634,860 B2* | 1/2014 | Huang et al. | 455/456.6 |
| 8,638,214 B2* | 1/2014 | Kummetz | 340/517 |
| 8,644,843 B2* | 2/2014 | Canon et al. | 455/456.1 |
| 8,655,371 B2* | 2/2014 | Huang | 455/456.1 |
| 8,695,078 B2* | 4/2014 | Low et al. | 726/9 |
| 8,700,060 B2* | 4/2014 | Huang | 455/456.1 |
| 8,756,010 B2* | 6/2014 | Gupta et al. | 701/491 |
| 2003/0050754 A1 | 3/2003 | Edwards et al. | |
| 2008/0076451 A1 | 3/2008 | Sheha et al. | |
| 2008/0242305 A1 | 10/2008 | Kahlert et al. | |
| 2009/0110302 A1 | 4/2009 | Snow | |
| 2009/0201149 A1 | 8/2009 | Kaji | |
| 2010/0004997 A1 | 1/2010 | Mehta et al. | |
| 2010/0085895 A1 | 4/2010 | Bajko | |
| 2010/0273504 A1 | 10/2010 | Bull et al. | |
| 2011/0087431 A1 | 4/2011 | Gupta et al. | |

FOREIGN PATENT DOCUMENTS

| | | |
|---|---|---|
| JP | 2007114988 A | 5/2007 |
| JP | 2008275838 A | 11/2008 |
| JP | 2009098025 A | 5/2009 |
| JP | 2009098446 A | 5/2009 |
| TW | I286202 B | 9/2007 |
| WO | WO-2009151925 A2 | 12/2009 |

OTHER PUBLICATIONS

International Search Report and Written Opinion—PCT/US2010/052386, International Search Authority—European Patent Office—Mar. 21, 2011.

Taiwan Search Report—TW099134771—TIPO—Oct. 9, 2013.

* cited by examiner

METHOD AND APPARATUS FOR IDENTIFICATION OF POINTS OF INTEREST WITHIN A PREDEFINED AREA

CROSS REFERENCE TO RELATED APPLICATIONS

This application is a divisional of U.S. application Ser. No. 12/901,304, entitled "Method and Apparatus for Identification of Points of Interest within a Predefined Area," filed Oct. 8, 2010, which claims the benefit of and priority, under 35 USC 119, to U.S. Provisional Application Ser. No. 61/250, 862, filed Oct. 12, 2009, entitled "Estimating Indoor Graphical Structure Using Measurements," both of which is assigned to the assignee hereof and which are incorporated herein by reference.

BACKGROUND

1. Field

The subject matter disclosed herein relates to correlating location estimates in time and space and identifying points of interest in a predefined area based at least in part on a set of location estimates.

2. Information

Navigation systems are becoming more and more pervasive in today's market. A navigation system may be utilized to determine a route from a first location to a second location. In some navigation systems, a user may enter a start location and an end location into a mapping application, such as one of the different mapping applications commonly used on Internet websites.

Navigation systems may determine navigation directions within an indoor environment based at least in part on known structural elements within the indoor environment, such as locations of walls or doors, for example. However, navigation systems may not have an ability to determine navigation directions within an indoor environment for which a corresponding map or grid indicating locations of structural elements is not available.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
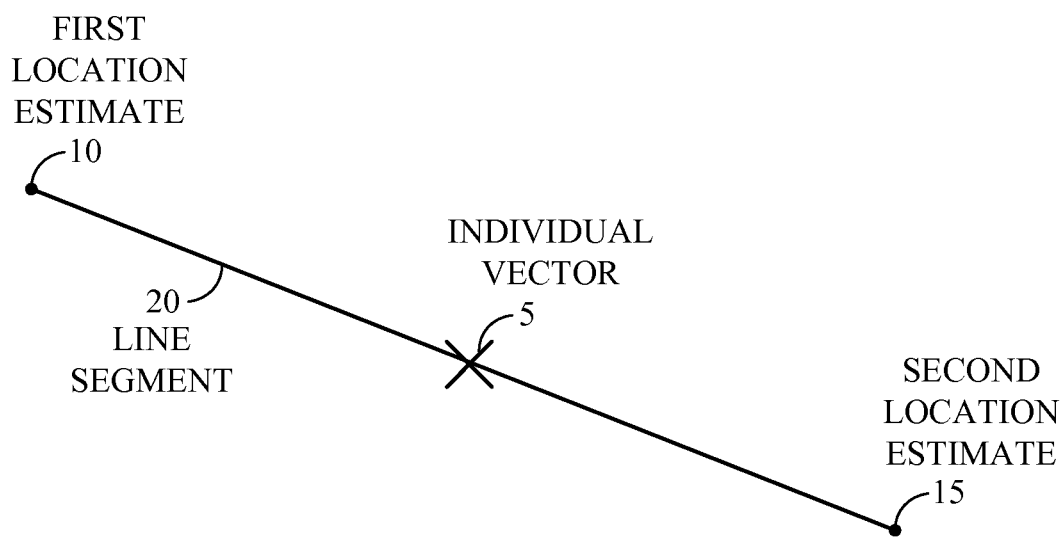
FIG. 1 illustrates an individual vector according to one or more implementations.

In one particular implementation, one or more location estimates may be accessed for one or more mobile devices within a predefined area. One or more location estimates may be correlated in time and space to determine a set of location estimates associated with one or more substantially stationary users. One or more points of interest may be identified within the predefined area based at least in part on a first set of location estimates.

In one particular implementation, one or more location estimates may be correlated in time and space to determine a set of location estimates associated with one or more users in motion. One or more corridors within the predefined area may be identified based at least in part on the location estimates.

It should be understood, however, that these are merely example implementations, and that claimed subject matter is not limited in this respect.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

According to some implementations of navigation systems, electronic maps may be transmitted to a mobile device for display on a user's mobile device, for example. An "electronic map," as used herein may refer to an electronic representation of a map depicting an area. For example, an electronic map may depict locations of one or more offices, rooms, or other structural elements and/or pathways within an area such as a structure or an outdoor area. In one particular implementation, an electronic map may depict locations of structural elements on one or more floors of a building. An electronic map may be presented to a user on a display device, such as a display screen of a mobile device. An electronic map may include or be associated with a grid, such as a Cartesian grid showing coordinates, such as x,y coordinates in a 2-dimensional place. It is understood that other embodiments may utilize non-Cartesian maps or multiple dimensions. A processing device, such as a processor of a map server, for example, may analyze and/or manipulate an electronic map to infer locations of certain map features, such as locations of point of interest and/or corridors between such points of interest, as discussed below.

Some navigation systems may determine navigation instructions to guide a user from a starting location to one or more destinations. For example, navigation instructions such as "turn left," "turn right," or "walk straight for 75 feet" may be presented to a user visually on a display screen or audibly via a speaker or earphones of a mobile device. A navigation application may analyze features of an electronic map to determine how to guide a user from a starting location to an end location in a route, for example. To accurately and/or efficiently guide a user from a starting location to an end location in a route, a user may be directed along one or more corridors to reach the end location. A "corridor," as used herein, may refer to a pathway along which a user may travel to or from a point of interest. A corridor may comprise a hallway along which one or more offices, meeting rooms, stores, bathrooms, or other points of interest are accessible. A corridor may comprise a pathway along one or more floors of a structure such as an office building, for example.

A "point of interest," as used herein, may refer to a location within a certain area which may be of interest to a person, such as a user of a mobile device. For example, a point of interest may comprise a location or area within an indoor environment that is visited by one or more users from time to time. Examples of points of interest include office rooms, bathrooms, meeting rooms, cafeterias, and stores, to name just a few among many different examples.

In one or more implementations, as discussed herein, a user may carry a mobile device for which location information is estimated from time to time. In some implementations, a mobile device may determine its own location, for example. In one particular implementation, a mobile device may estimate its location based on navigation signals received from a Satellite Positioning System (SPS), such as GPS or Galileo by, for example, correlating pseudorange measurements from several (e.g., four or more) transmitters.

However, a mobile device may be utilized within an area where navigation signals from a Satellite Positioning System (SPS) are not available, such as, for example, within certain structures such as buildings. In one implementation, a mobile device may estimate its location based on signals wirelessly received from wireless network elements or other devices capable of wirelessly transmitting signals. Wireless network elements, such as wireless local area network (WLAN) access points, may be located throughout such an area at known locations and a mobile device may estimate ranges from the mobile device to particular wireless network elements (e.g., by measuring received signal strength or round-trip delay). Such ranges may be estimated, and a location of such a mobile device may be triangulated using known techniques.

A network element may estimate a location for a mobile device according to some implementations. Location estimates for one or more mobile devices may be acquired over a period of time and transmitted to a server or database for processing. Such location estimates may be gathered for users of mobile devices within an indoor environment to determine movement of such users within the indoor environment over time. Examples of indoor environments may include office buildings, shopping malls, stadiums, convention centers, apartment buildings, or other physical structures, to name just a few examples. In some implementations, for example, locations estimates may also be acquired over a period of time for users within certain outdoor enclosed areas, such as zoos, parking structures, or amusement parks.

In an indoor environment, for example, individuals working within an office building may carry their own mobile devices and location information, such as location estimates, for one or more of the mobile devices may be acquired to determine movement of such individuals over a period of time. Such location estimates may be utilized to infer locations of points of interest and/or corridors between such points of interest within a certain area.

In one or more implementations, a time stamp may be associated with one or more location estimates to associate a time at which each of such location estimates was taken. For example, if a location estimate for a mobile device is estimated, the location estimate may be associated with a particular time stamp or time reference at which the location estimate was determined. A location estimate may be paired with a time stamp and stored in a memory, for example. For example, if a mobile device estimates its own location, the mobile device may reference an internal clock to determine an associated time stamp for each associated location estimate. Such time stamps and location estimates may be correlated in time and space, and utilized to infer whether a user was relatively stationary for a given time period or was in motion for a time period. For example, if several location estimates with successive time stamps indicate that a mobile device has not moved more than a predefined minimum threshold distance during a time period during which the location estimates were acquired, a processing device, such as a processor of a map server, may infer that the mobile device has remained "substantially stationary" during the time period.

If location estimates associated with several successive time stamps indicate that a movement of a mobile device exceeds predefined minimum threshold distance between successive time stamps, a processing device may instead infer that the mobile device was in motion during the relevant time period. Location estimates associated with substantially stationary users may be utilized to infer locations of one or more points of interest. Location estimates associated with users in motion may be utilized to infer locations and directions of travel of one or more corridors, as discussed below.

A map server may have access to an electronic map that may indicate locations of structural partitions, such as walls, but may not indicate points of interest or corridors. For example, if only a portion of a floor in an office building is currently occupied or being used, there may not be any points of interest on a portion of the floor which is not in use or is otherwise vacant. However, a map server may not be able to directly determine where relevant points of interest or corridors are located by simply analyzing an electronic map, such as via typical image processing techniques. Location information for mobile devices of users may be utilized to infer locations of points of interest and corridors between points of interest, for example. If locations of points of interest and corridors have been inferred, one or more electronic maps may be annotated with information indicating such locations.

In some implementations, a map server may not have access to an electronic map for a given area and may instead generate an electronic map. For example, a map server may initially create a blank electronic map and may annotate the electronic map over time as locations of points of interest and corridors are inferred from received location estimates.

A map server or other device receiving location estimates may first determine, based at least in part on associated time stamps, which location estimates are representative of substantially stationary users and which are representative of users who were in motion at the time that the location estimates were estimated.

A Cartesian grid (e.g., an x-y coordinate grid) may be associated with an area depicted on an electronic map. In one or more implementations, location estimates associated with users who were substantially stationary at the time the locations were estimated may be plotted on a Cartesian grid associated with an electronic map. Next, plotted location estimates within a certain proximity or range of each other may be grouped together to form various clusters. A server may infer that one or more of such clusters represents a point of interest. For example, a cluster of many location estimates within a close proximity of each other may indicate that one or more users carrying mobile devices were in roughly the same location for an extended period of time. Accordingly, a server may infer that a point of interest is associated with such a cluster.

Location estimates representative of a user in motion may be processed to determine one or more vectors indicating a user's movement. A "vector," as used herein may refer to a quantity that includes a magnitude and a direction. A vector for a particular user may be referred to herein as an "individual vector" and may represent movement of a user during a particular time interval. A direction and a magnitude of a vector may be determined based at least in part on two successive location estimates for a particular mobile device of a user. For example, a magnitude of a vector may be determined based at least in part on a distance between a first location estimate and a second location estimate for a mobile device if a time interval between a first time associated with the first location estimate and a second time associated with the second location estimate. For example, a magnitude of an individual vector may be proportionate to a distance traveled by a user during a time interval. A direction of a vector may be determined with respect to a coordinate system corresponding to an electronic map. For example, movement of a user between a first location estimate and a second location estimate may be identified and a direction of the movement may be determined with respect to a Cartesian coordinate system. If an individual vector is determined, the individual vector may be associated with one or more points on a Cartesian coordinate system.

FIG. 1 illustrates an individual vector 5 according to one or more implementations. FIG. 1 illustrates a first location estimate 10 and a second location estimate 15 for a mobile device of a user. For example, a user may carry a mobile device from a location associated with first location estimate 10 to a location associated with second location estimate 15 during a particular time interval. Individual vector 5 may be determined, for example, by projecting a line segment 20 between first location estimate 10 and second location estimate 15. A magnitude of individual vector 5 may be based at least in part on a length of line segment 20, for example. A direction of individual vector 5 may be determined based at least in part on difference in terms of Cartesian coordinates, for example, between first location estimate 10 and second location estimate 15. In one or more implementations, first location estimate 10 and second location estimate 15 may be associated with horizontal and vertical coordinates within a 2-dimensional space, such as x,y coordinates. If magnitude and direction of individual vector 5 have been determined, a location of individual vector 5 with respect to a Cartesian coordinate system may subsequently be determined. In one particular implementation, an individual vector 5 may be represented by a point located at a midpoint of line segment 20, together with an indication of its magnitude and direction. A midpoint of line segment 20 may be identified by Cartesian coordinates representative of the middle of line segment 20, for example.

There may be several consecutively determined location estimates for a mobile device of a particular user that indicate that the user was in motion. For example, a minimum threshold distance between consecutively determined location estimates for a user may indicate that the user was in motion at a time when such location estimates were determined. One or more vectors may be determined to represent a user's movement. A vector may represent movement of a user between any two or more points on a Cartesian grid associated with an electronic map, as discussed above. A vector may originate or begin at a particular location estimate for a user and extend to a subsequently determined location estimate. A velocity for a user may be estimated by dividing a distance between consecutively determined location estimates by a time difference between when such location estimates were determined. Such a time difference may be determined based at least in part on a difference between time stamps associated with such consecutively determined location estimates. Various vectors indicating movement of one or more users may be determined over a period of time, and may be grouped to form a cluster vector descriptive of a combination of individual vectors located within relatively close proximity of one another on a Cartesian grid corresponding to an electronic map.

A "cluster vector," as used herein may refer to a vector representative of a combination of individual vectors. For example, several individual vectors may be combined to determine a cluster vector representative of the individual vectors being combined. For example, if several individual vectors are located at specific locations or points on a Cartesian grid and are grouped, a centroid of the individual vectors of the group may be determined. A cluster vector may be located at such a centroid. A direction and magnitude of a cluster vector may be determined, for example, by vector addition (and then scaling by the number of vectors added) of the respective directions and magnitudes of individual vectors in one or more implementations. Locations and directions of travel through one or more corridors may be inferred based at least in part on such cluster vectors.

Locations of some points of interest and corridors may be estimated based at least in part on location estimates for a single mobile device. However, location estimates for multiple mobile devices may be utilized to make potentially more accurate estimations of locations of points of interest and corridors within an area depicted on an electronic map.

According to one or more implementations, locations of points of interest and/or corridors may be inferred regardless of whether a detailed electronic map for an area is available. For example, location estimates and associated time stamps for one or more mobile devices within an area, such as an office building, may be transmitted to a server. In one or more implementations, such a server may infer locations of one or more points of interest and/or corridors based at least in part on location estimates and associated time stamps for one or more mobile devices.

Figure 2:
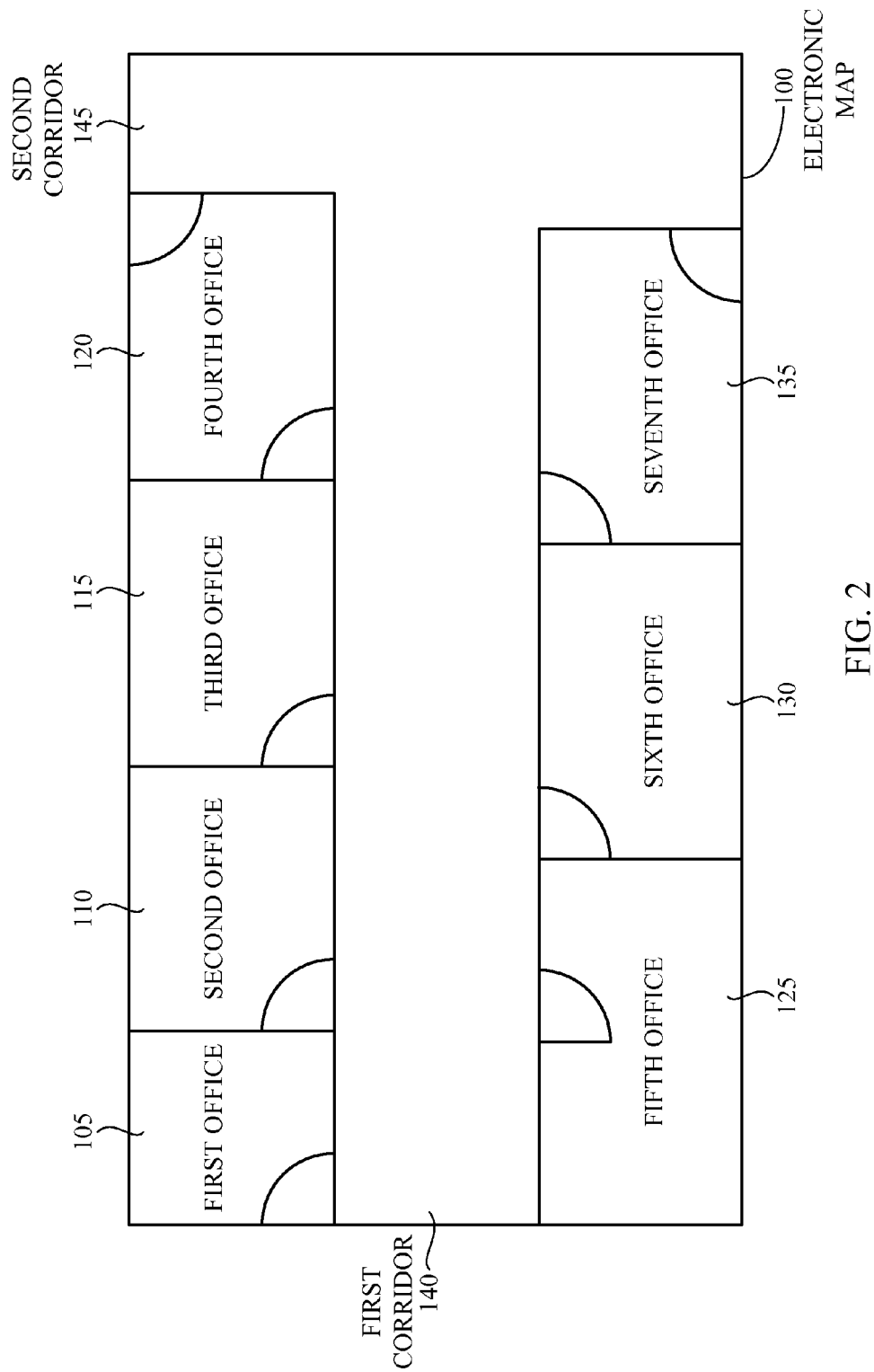
FIG. 2 is topography of an electronic map according to one or more implementations.

FIG. 2 is topography of an electronic map 100 according to one or more implementations. Electronic map 100 may comprise a digital representation of a map that may be presented on a display screen of a user's mobile device. Electronic map 100 may be stored in a database or server and may be transmitted to a user's mobile device in response to a request for the electronic map 100. Electronic map 100 may display a floor plan for a structure such as an office building. In one example implementation, electronic map 100 may be acquired by scanning a blueprint of a layout of a floor of a building, for example, and may be annotated with information indicative of various points of interest and corridors, as discussed below with respect to FIGS. 2-9.

As shown, electronic map 100 illustrates several offices or rooms, such as first office 105, second office 110, third office 115, fourth office 120, fifth office 125, sixth office 130, and seventh office 135. Electronic map 100 also shows a first corridor 140 and a second corridor 145.

In one particular implementation, for example, electronic map 100 may include various lines forming depicted outlines or boundaries of offices or corridors, but electronic map 100 may not indicate which of such lines form such offices or corridors. Accordingly, a server or processing device having access to electronic map 100 may not be able to identify locations of offices or corridors on electronic map 100 based solely on locations of lines shown in FIG. 2.

Points of interest and corridors may be identified on electronic map 100 based at least in part on periodically determined location estimates for one or more mobile devices. Location estimates which indicate that a mobile device of a user has remained substantially stationary for a given period of time may be grouped to form a cluster. An approximate centroid or center point of a cluster may approximate a location of a point of interest based at least in part on the cluster.

Figure 3:
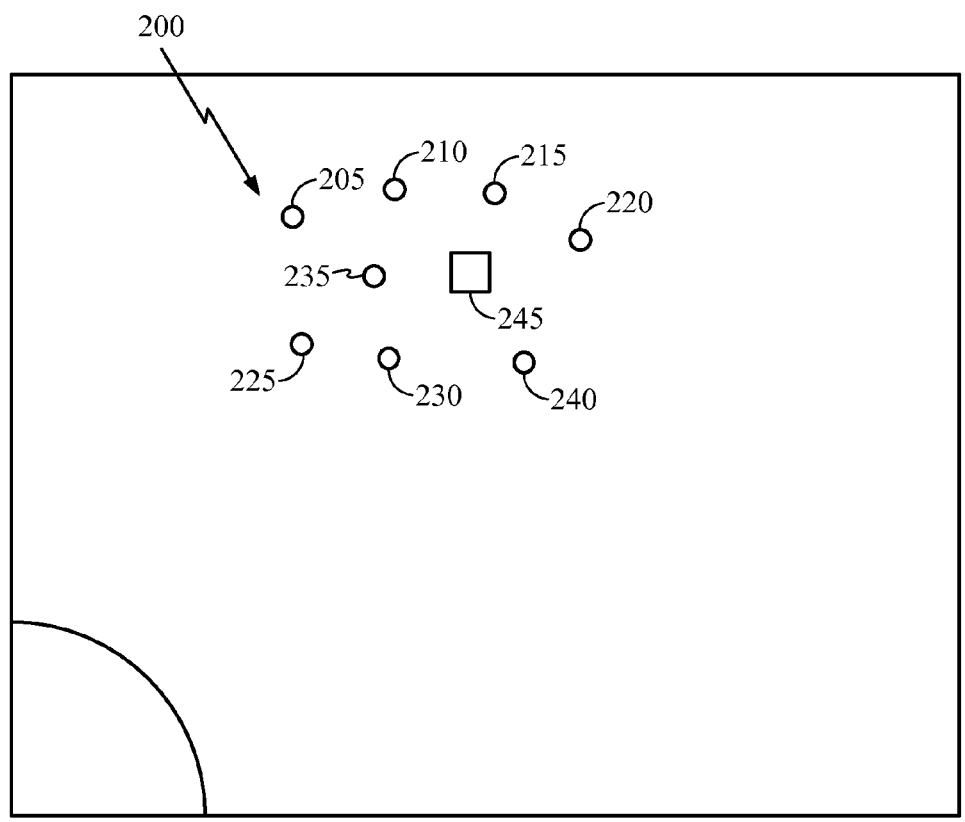
FIG. 3 illustrates a cluster of estimated locations of one or more mobile devices acquired over a period of time according to one or more implementations.

FIG. 3 illustrates a cluster 200 of estimated locations of one or more mobile devices acquired over a period of time according to one or more implementations. FIG. 3 illustrates location estimates gathered over a period of time from one or more mobile devices. For example, location estimates may be determined every 15 seconds for a mobile device. In one particular implementation, a mobile device may estimate its location based on navigation signals received from an SPS, such as GPS or Galileo by, for example, correlating pseudorange measurements from several (e.g., four or more) transmitters.

As shown in FIG. 3, first location estimate 205, second location estimate 210, third location estimate 215, fourth location estimate 220, fifth location estimate 225, sixth location estimate 230, seventh location estimate 235, and eighth location estimate 240 may be acquired for a mobile device. After such location estimates have been accessed or acquired, such location estimates may be grouped into one or more clusters correlated in terms of space. In this example, location estimates are grouped into cluster 200. After one or more clusters are determined, a point of interest 245 based at least in part on cluster 200 may be determined. In this example, a location of point of interest 245 may be approximated as the centroid center of cluster 200. Although FIG. 3 only illustrates a single cluster 200, it should be appreciated that there may be multiple clusters and points of interest on a map.

Figure 4:
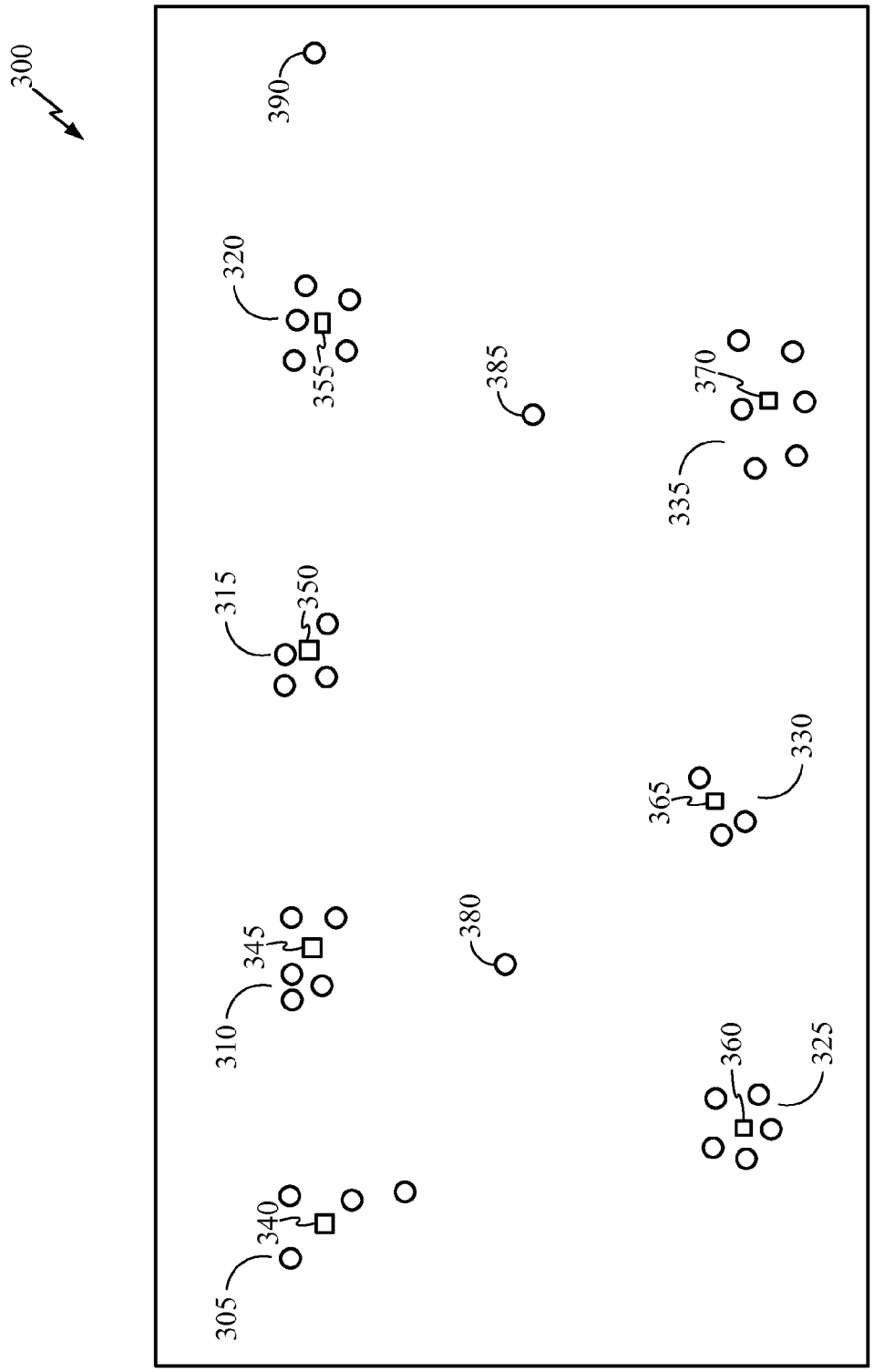
FIG. 4 illustrates multiple points of interest on an electronic map according to one or more implementations.

FIG. 4 illustrates multiple points of interest on an electronic map 300 according to one or more implementations. As shown, electronic map 300 illustrates an outline or perimeter of a structure, but not locations of walls or other structural elements defining rooms or corridors, for example. Electronic map 300 shows location estimates for one or more mobile devices that are accumulated over a period of time. Location estimates may be grouped into one or more clusters. A Cartesian grid may be associated with electronic map 300 and may be utilized in connection with grouping location estimates into clusters. In one implementation, for example, a cluster may be formed based on a range or distance from one location estimate to other location estimates. For example, a grouping of location estimates, each within a maximum threshold distance from a certain location, may be considered to be a cluster. In one or more implementations, different clusters may be associated with different numbers of location estimates. For example, there may be five location estimates within a first cluster and eight location estimates within a second cluster. A number of clusters may be selected to represent all location estimates, for example.

In this example, location estimates have been grouped into seven different clusters—a first cluster 305, second cluster 310, third cluster 315, fourth cluster 320, fifth cluster 325, sixth cluster 330, and seventh cluster 335. A centroid of a cluster may be determined and subsequently used to represent the cluster. One or more points of interest may be associated with a centroid for a cluster. First point of interest 340 may be associated with first cluster 305, second point of interest 345 may be associated with second cluster 310, third point of interest 350 may be associated with third cluster 315, fourth point of interest 355 may be associated with fourth cluster 320, fifth point of interest 360 may be associated with fifth cluster 325, sixth point of interest 365 may be associated with sixth cluster 330, and seventh point of interest 370 may be associated with seventh cluster 335. As shown in FIG. 4, respective points of interest may be located at centroids of associated clusters.

Electronic map 300 shows several location estimates that have not been grouped into any particular cluster to determine a point of interest. As shown, first location estimate 380, second location estimate 385, and third location estimate 390 have not been grouped into any particular cluster in this example. If first location estimate 380, second location estimate 385, and third location estimate 390 are each associated with consecutive time stamps for a single mobile device, such location estimates may indicate that a user of the mobile device had been moving through an area while such location estimates were determined. Such location estimates may be utilized to determine a location of one or more corridors with sufficient accuracy. In some examples, a mere three location estimates may not be sufficient to accurately determine a location of one or more corridors.

Figure 5:
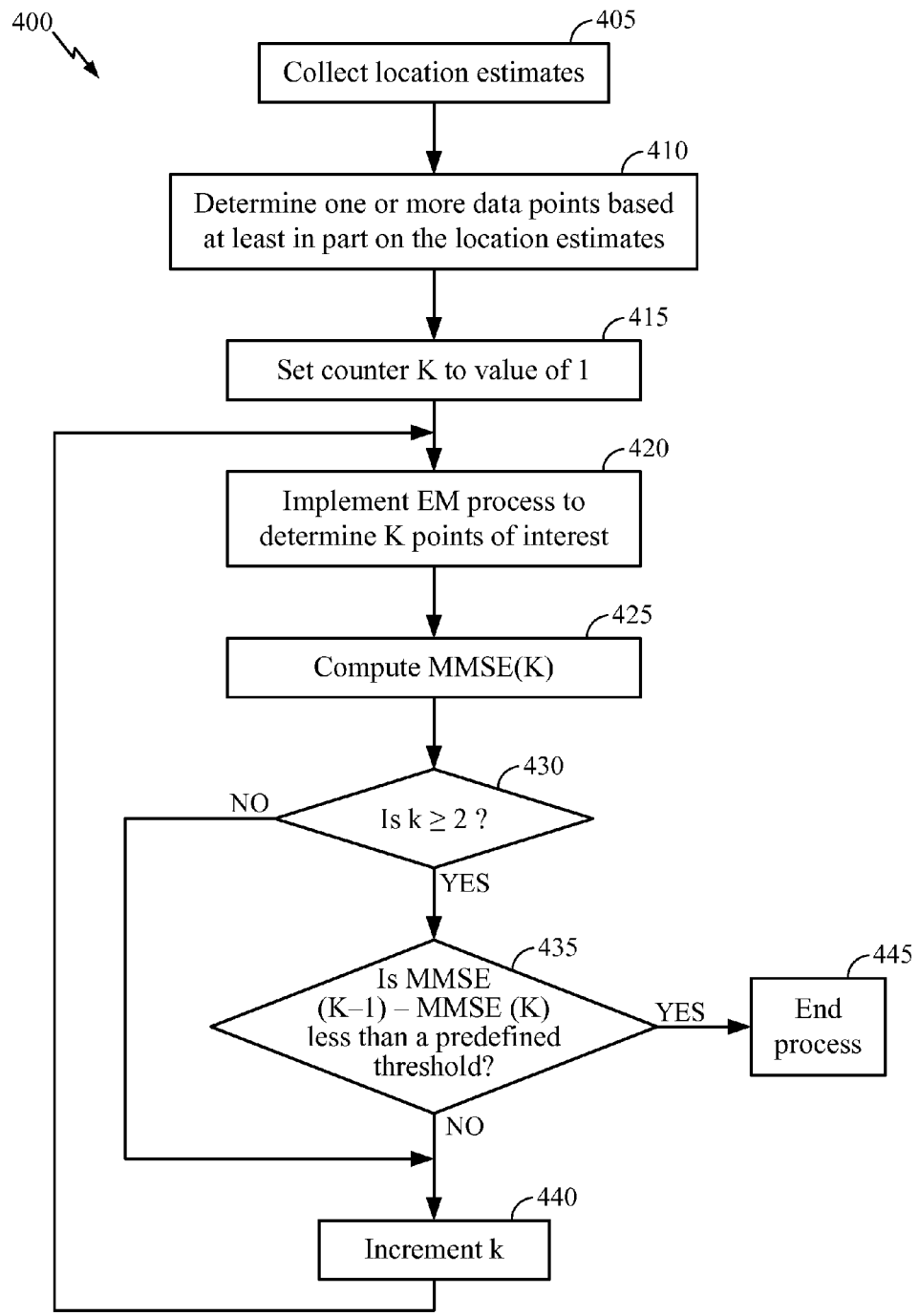
FIG. 5 is a flow diagram of a process for determining one or more points of interest according to one or more implementations.

An expectation-maximum (EM) process, such as one shown in J. A. Bilmes, "A Gentle Tutorial of the EM Algorithm and its Application to Parameter Estimation for Gaussian Mixture and Hidden Markov Models," International Computer Science Institute, Pp. 1-13, April 1998, may be utilized to determine locations of points of interest. FIG. 5 illustrates a flow diagram of a process 400 for determining one or more points of interest according to one or more implementations. Process 400 may be implemented, for example, by a map server or other processor adapted to determine locations of points of interest for a given area. First, at operation 405, location estimates and associated time stamps for one or more mobile devices are accumulated and stored for processing. If a user enters or approaches a point of interest, such as an office, room, or cafeteria, for example, the user may remain within the point of interest for a certain amount of time before leaving. While situated at a location associated with a point of interest, a user's mobile device may estimate its location and report its location estimate and associated time stamp periodically to a location or map server, for example.

There may be several location estimates for mobile devices located within an area depicted on one or more electronic maps. Location estimates indicative of users who have remained substantially stationary for a length of time may be utilized to infer locations of points of interest corresponding to an area depicted on an electronic map. Location estimates indicative of users in motion, on the other hand, may instead be utilized to infer locations of corridors, for example. A determination of whether one or more location estimates are indicative of a user who is substantially stationary or in motion may be determined based at least in part on a distance between successive location estimates for a mobile device of the user. For example, if successive location estimates are within a predefined threshold range or distance or each other, such as within 3.0 meters, for example, such location estimates may indicate that a user was substantially stationary.

On the other hand, successive location estimates for a user located outside of a predefined threshold range may indicate that a user was in motion during a time interval associated with such successive location estimates.

A location estimate corresponding to a substantially stationary user may be utilized as a "data point" to identify a point of interest. Accordingly, at operation 410, one or more data points may be determined based at least in part on location estimates accumulated at operation 405. As discussed above, a number of location estimates may be initially analyzed to determine which of the location estimates correspond to mobile devices of user who were substantially stationary at the time when such location estimates were obtained. Location estimates corresponding to mobile devices of users who were substantially stationary at a time when the location estimates were obtained may subsequently be utilized as data points to infer locations of one or more points of interest.

After a predetermined number of data points have been identified, locations of one or more points of interest may be approximated based at least in part on such data points. For example, data points may be grouped into clusters around certain points of interest, as discussed above with respect to FIG. 4. For a given set of data points, a number of points of interest may be determined. If, for example, five hundred data points are accumulated and identified for a relatively large area, such as an entire floor of an office building, all five hundred points could theoretically be utilized to determine only one point of interest for the entire floor. However, determination of a single point of interest based on all data points may not be associated with a relatively large expected error between data points and points of interest. Accordingly, additional points of interest may be determined to reduce such an expected error.

In one implementation, an iterative process may be implemented to determine a desired number of points of interest based on applicable data points for a given area. Such an iterative process may analyze a set of data points to identify one or more points of interest. A point of interest may be associated with a cluster of data points, for example. If a certain number of points of interest have been determined, a corresponding minimum mean square error (MMSE) measurement between each data point and then identified points of interest may be calculated. An MMSE measurement may be indicative of a mean square error, e.g., a difference between an estimated value and a true value of a quantity being estimated, which in this case may comprise a difference between an estimated location of a point of interest and each data point associated with that particular point of interest.

If, for example, there are 1000 data points for a given area, and each data point is associated with only one point of interest, then there would be 1000 points of interest, each of which would be located at the exact location indicated by its associated data point. However, in many implementations, there may be so many acquired data points that it would not be helpful or computationally efficient to identify a unique point of interest for each individual data point. Instead, data points may be grouped into clusters and each cluster may be associated with one or more points of interest. An expected error may be introduced if multiple data points in a cluster are assigned to a single point of interest because such data points may not be located at exactly the same physical location on a Cartesian grid associated with an electronic map, for example. A determination of an MMSE measurement is merely one way of estimating such an expected error and claimed subject matter is not limited in this respect. An Expectation-Maximum (EM) process may iteratively determine a desired number of points of interest based on a set of collected data points while ensuring that an MMSE measurement is at an acceptably low level.

If only one point of interest is associated with all available data points, for example, a measurement of MMSE may be at a relatively high value. However, if an additional point of interest is determined, so that there are now two points of interest, a measurement of MMSE may decrease. As additional points of interest are determined for a given set of data points, a measurement of MMSE may continually decrease as the number of calculated points of interest increases. However, a measurement of MMSE may decrease at an increasingly smaller rate as the number of calculated points of interest increases. Accordingly, there is a trade-off between the number of points of interest and an incremental reduction in a measurement of MMSE. An EM process may be implemented to incrementally calculate additional points of interest based on a set of data points until an incremental reduction of MMSE by determining one additional point of interest is below a predefined threshold level or value.

In one implementation, a number of points of interest determined may increase until a difference between (a) an MMSE measurement for k points of interest, and (b) an MMSE measurement for (k−1) points of interest, is below a predefined threshold. A processor may identify a number of points of interest to reduce an incremental reduction in a measurement of MMSE to below a threshold value.

Referring back to FIG. 5, at operation 415, a counter k may be initialized to a value of 1. Counter k may represent a number of points of interest determined by process 400 for a given set of data points. In one or more implementations, accumulated data points may be utilized to infer locations of points of interest.

$Y_j$ ($1 \leq j \leq N$) may represent set of data points used to calculate points of interest, where N denotes a number of collected data points determined at operation 410, and j represents an index to particular data points $X_1$ ($1 \leq i \leq k$) may represent a location of a particular point of interest. If counter k were equal to a value of zero (e.g., if there were zero points of interest), a measurement of MMSE (e.g., MMSE(0)) may approach ∞.

At operation 420, an EM process may be implemented to determine k points of interest to reduce a measurement of MMSE. At operation 425, MMSE (k) may be determined MMSE(k) may be determined as $\Sigma_{i=1}^{N}\|Y_j-\hat{Y}_j\|^2$, where $\hat{Y}_j \in \{X_i : 1 \leq i \leq k\}$ and $\hat{Y}_j$ is a location of a point of interest nearest to $Y_j$.

At operation 430, a determination may be made regarding whether k≥2. If "yes," processing proceeds to operation 435; if "no," on the other hand, processing proceeds to operation 440. At operation 435, a determination is made as to whether a difference between MMSE (k−1) and MMSE (k) is below a predefined threshold amount. If "yes," processing proceeds to operation 445 at which point processing ends and k total points of interest have been determined. If "no," on the other hand, processing proceeds to operation 440, where counter k is incremented. Processing then returns to operation 420 and continues until a difference between MMSE (k−1) and MMSE (k) is below a predefined threshold amount.

After one or more points of interest have been determined, information indicating locations of determined points of interest may be stored in a database or server along with a corresponding electronic map and/or a Cartesian grid associated with the electronic map. While an electronic map may indicate various points of interest, such points of interest by themselves may not be sufficient for a mapping application to route a user from a starting location to a destination unless corridors are also known or otherwise determined.

Corridors may be determined/identified based at least in part on an analysis of location estimates for mobile devices which are determined to be moving. For example, as discussed above, if a user is travelling from one point of interest to another point of interest, successive location estimates for a mobile device of the user may be relatively far apart in terms of distance, thereby indicating that the user was in motion at the time when such location estimates were determined. In order to determine locations of corridors, one or more vectors may be determined based at least in part on one or more location estimates for mobile devices of users in motion.

Various vectors may be determined based on location estimates and associated time stamps for users in motion during a given time interval. Here, by associating location estimates with time stamps, movement of users associated with such location estimates may be tracked over an area and expressed as vectors. Such vectors may be grouped into clusters to identify locations of corridors and directions of movement along the corridors. As discussed above with respect to FIG. 1, a vector may be associated with or located at a point on a Cartesian grid, for example. There may be several individual vectors located in a close proximity in an area where a corridor is located because one or more users may travel trough such a corridor occasionally during a given period.

Information about a direction and a magnitude of a vector may also be associated with a corresponding data point on a Cartesian grid. A vector may be determined based at least in part on two successive location estimates for a particular mobile device. In one or more implementations, on the other hand, a vector may be determined based on three or more successive location estimates. If a vector is determined based on more than two successive location estimates, for example, a curve fitting process based at least in part on such successive location estimates may be implemented to determine a magnitude and direction corresponding to the vector. Vectors for mobile devices of one or more users may be calculated based at least in part on location estimates acquired over a period of time for one or more users within a building or other structure depicted on an electronic map. By representing individual vectors at specific locations on an electronic map or Cartesian grid, such individual vectors may be grouped into clusters. A cluster vector may be identified for each cluster of individual vectors. A "cluster vector," as used herein may refer to a vector representative of a group of individual vectors. For example, a cluster vector may represent an average of individual vectors in a cluster.

FIG. 5, as discussed above, shows an EM process to utilize to determine a desired number of points of interest for a given area that results in an acceptable low level of error. A similar EM process may be utilized to group vectors to determine a number of cluster vectors. For example, a location of a data point corresponding to an individual vector may be utilized in an EM process. There may be a measurement of MMSE based at least in part on a number of cluster vectors, where an incremental measurement of MMSE between individual vectors and associated cluster vectors decreases as an overall number of cluster vectors increases. A number of cluster vectors may be determined such than an incremental decrease in an MMSE calculated by determining one additional cluster vector is below a predefined threshold amount.

Figure 6:
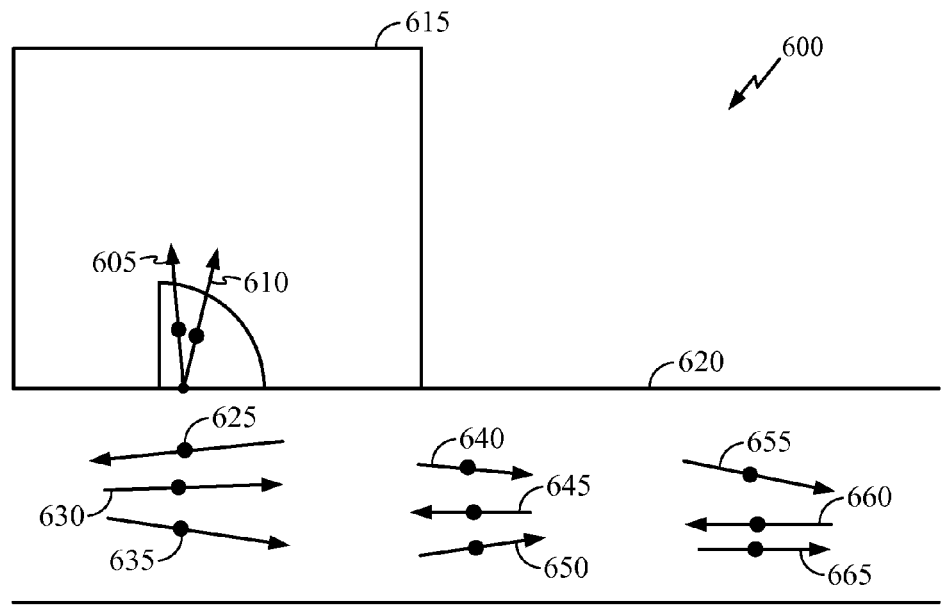
FIG. 6 illustrates example vectors shown on an electronic map according to one or more implementations.

FIG. 6 illustrates example vectors shown on an electronic map 600 according to one or more implementations. An electronic map 600 is depicted herein for the purpose of explaining the use of vectors to determine locations of corridors. It should be appreciated, however, that such vectors may not actually be displayed on a mobile device of a user. Instead, such vectors are shown to explain the type of processing that may be performed by a server or processor to identify corridors based on location estimates for one or more mobile devices of users who are in motion. A server or processor may perform calculations corresponding to such vectors based on a Cartesian grid, for example, associated with electronic map 600 that depicts specific points corresponding to locations on the electronic map 600.

Walls are shown in FIG. 6 to indicate how a user may move through an area having a corridor and a door to an office, for example. However, it should be appreciated that in some implementations, information descriptive of certain map features such as walls and office locations may not be available, and instead points of interest and corridors may be derived based at least in part on location estimates of mobile devices for various users moving through an area. In this example, a first vector 605 and a second vector 610 both extend in through a doorway at slightly different angles into an office 615. A corridor 620 is situated below office 615. There are several vectors located within corridor 620. For example, third vector 625, fourth vector 630, fifth vector 635, sixth vector 640, seventh vector 645, eighth vector 650, ninth vector 655, tenth vector 660, and eleventh vector 665 may be located within corridor 620. As shown, some vectors within corridor 620 point toward a right-hand side of electronic map 600, whereas other vectors point toward a left-hand side of electronic map 600.

Individual vectors may be grouped into clusters and a cluster vector representative of a cluster may be identified. As discussed above, individual vectors may be represented by data points with associated information about direction and a magnitude. A magnitude of an individual vector may be determined based at least in part on a distance and/or a velocity at which a user traveled between successive location estimates for the user. Points corresponding to individual vectors may be grouped into clusters. For example, several vectors associated with data points within a close proximity of one another may be grouped into a cluster. Given an index value of k, for example, an EM process may be utilized to determine a best way to group available data points into k clusters. Location estimates and direction information contributions from each individual vector in a cluster may be utilized to determine a cluster vector for a particular cluster of individual vectors.

For example, first and second vectors 605, 610 may be grouped into a cluster. Third, fourth, and fifth vectors 625, 630, and 635 may be grouped into a second cluster. Sixth, seventh, and eight vectors 640, 645, and 650 may be grouped into a third cluster. Ninth, tenth, and eleventh vectors 655, 660, and 665 may be grouped into a fourth cluster.

Figure 7:
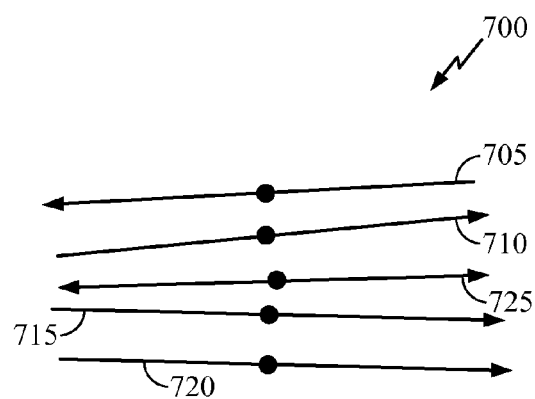
FIG. 7 illustrates a cluster of vectors according to one or more implementations.

FIG. 7 illustrates a cluster 700 of vectors according to one or more implementations. First vector 705, second vector 710, third vector 715, and fourth vector 720 may form cluster 700. A cluster vector 725 may be determined that is representative of an entire cluster 700 of individual vectors. As discussed above, an individual vector may be located at a particular point on a Cartesian grid, for example, and may be associated with both a magnitude and a direction. However, individual vectors and cluster vectors are shown as line segments in FIG. 7 for the purpose of illustrating a process of determining a cluster vector to represent a cluster of individual vectors. A centroid of a cluster 700 may be determined and the centroid may be utilized as a point representing a location of a cluster vector 725.

As shown, individual vectors, such as first vector 705, may point in one direction as indicated by an arrowhead at an end of first vector 705. A direction of an arrow may be based at least in part on a direction in which a user was moving between a time at which the user's location (e.g., a first location estimate) was initially estimated and a subsequent time at which the user's location (e.g., a second location estimate) was estimated. Cluster vector 725, on the other hand, may include arrowheads at each end pointing in opposite directions. Cluster vector 725 may include arrowheads on opposing ends to indicate that a user may travel in either of two directions along a corridor, e.g., either to the left or to the right. Accordingly, to efficiently determine or identify corridors, vectors for users travelling in opposing directions may be utilized to determine a cluster vector 725.

Figure 8:
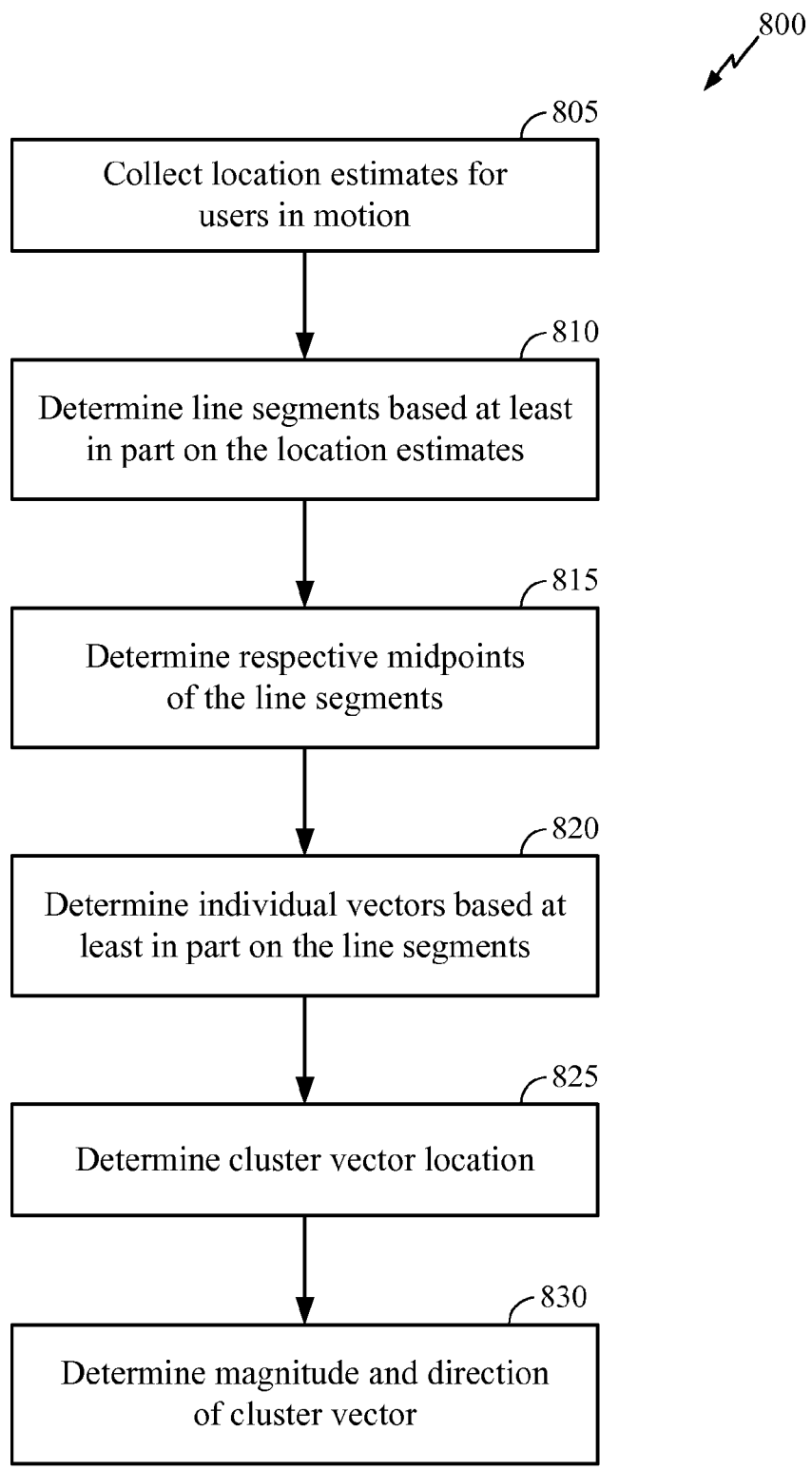
FIG. 8 is a flow diagram of a process for determining a location of a cluster vector according to one or more implementations.

FIG. 8 is a flow diagram of a process 800 for determining a location of a cluster vector according to one or more implementations. First, at operation 805, location estimates may be collected for one or more mobile devices. Next, at operation 810, line segments may be determined based at least in part on location estimates. For example, line segments may be projected through successive location estimates for a mobile device of a particular user if the location estimates for the user are spaced apart by at least a minimum threshold distance. For example, a user who is in motion may travel at least such a threshold distance during a time interval between successive location estimates for the user's mobile device.

At operation 815, respective midpoints of one or more line segments may be determined. A midpoint of a line segment may be utilized as a location point of a corresponding individual vector to simplify grouping of vectors into clusters, for example. At operation 820, individual vectors may be determined based at least in part on the line segments. A cluster vector may be determined to represent an average of components of individual vectors in a cluster.

An expected error may be introduced if a cluster vector is determined based on an average of individual vectors. Such an expected error may be introduced, for example, if individual vectors are in a cluster are not all located at the same exact point on a Cartesian grid. An iterative process may be implemented to increase a number of cluster vectors to which individual vectors may be associated. When an additional cluster vector is determined, an expected error between individual vectors and associated cluster vectors may decrease. With each additional cluster vector added, an expected error may decrease by an increasingly smaller amount.

Referring back to FIG. 8, in one or more implementations, an EM process similar to that discussed above with respect to FIG. 4 may be implemented using individual vectors to determine locations of cluster vectors at operation 825. An EM process may be utilized to determine a desired number of clusters of individual vectors. A centroid or approximate center of particular cluster may be utilized as a location point of the cluster. Additional processing may be performed to determine a direction and magnitude of a particular cluster vector after its location point has been identified.

At operation 830, a magnitude and a direction of a cluster may be determined. In a 2-dimensional (e.g., x,y) plane, for example, an individual vector may be represented by a magnitude in an x-axis direction and by a magnitude in a y-axis direction. An x-axis component of a cluster vector may be determined, for example, by summing x-axis components of all individual vectors in a cluster and then dividing the sum by a total number of individual vectors in the cluster. A y-axis component of a cluster vector may be determined in a similar manner.

A direction of a cluster vector may be represented by an angle in degrees or radians relative to the origin on a Cartesian grid, for example. An iterative process may be implemented to compare different estimates of an angle of a cluster vector against angles of each individual vector in a cluster. For example, an estimate of a direction/angle of a cluster vector may be compared with respective directions/angles corresponding to individual vectors in a cluster. An estimate error associated direction/angle for a cluster vector may be determined.

$Sa(\theta_1, \theta_2)$ may be defined as a smallest non-negative angle between two angles denoted as $\theta_1$ and $\theta_2$. In one example, $Sa(357°, 13°)$ is 16°, because the smallest angle between angles of 357 degrees and 13 degrees is 16 degrees. A relationship of $Sa(\theta_1, \theta_2)$ may be utilized to ensure that data vectors are facing in the proper direction. For example, to accurately determine an angle $\theta$ for a cluster vector associated with a minimum expected error, each individual vector for a given cluster may point in the same general direction, such as either pointing toward the right or toward the left-hand side of an electronic map, or facing up or down, for example. If however, some vectors point in a direction away from a majority of the other vectors in a cluster, 180 degrees may be added to the vectors pointing away, to ensure that all of the vectors in a cluster point in the same general direction, as discussed below with respect to FIGS. 9A-C.

Figure 9A:
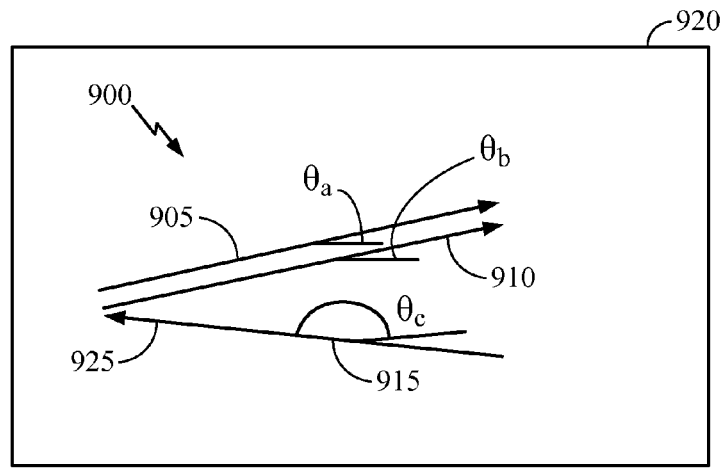
FIGS. 9A-C illustrate a clusters of vectors according to one or more implementations.

FIG. 9A illustrates a cluster 900 of vectors according to one or more implementations. As shown, a first vector 905 and a second vector 910 each point in a direction toward the right-hand side of a section of an electronic map 920 at a slight upward angle. However, a third vector 915 points toward the left-hand side of a section of an electronic map 920. First, second, and third vectors 905, 910, and 915 may be combined. For example, a direction of a cluster vector representative of cluster 900 may be determined. If a direction of a cluster vector has been determined, components, such as x,y coordinate components, if individual vectors along the direction of the cluster vector may subsequently be determined. Although x,y axis components of individual vectors are discussed above, it should be appreciated that in some implementations, corridors may be oriented along different axes that are not aligned as perpendicular x,y axes, for example. x,y components of individual vectors may be averaged to account for movement of users who travel along slightly different trajectories while travelling through the same corridor. Averaging x,y components of individual vectors in a cluster may account for minor variations in trajectory caused by individual vectors. In other words, if slight variations in trajectory of vectors are considered to be "noise," averaging x,y components of such vectors may effectively cancel or at least reduce effects of such noise components.

An x-axis component of a cluster vector may be determined by summing x-axis components of each summing first, second, and third vectors 905, 910, and 915 and then dividing by the total number of individual vectors in a cluster, which is 3 individual vectors in this example. A y-axis component of a cluster vector may be determined in a similar manner. Based on determined x-axis and y-axis components, a direction of a cluster vector representative of cluster 900 is therefore determined. A reason for averaging x,y components of individual vectors to determine a direction of a cluster vector is to account for movement of users who travel along slightly different trajectories while travelling through the same corridor. Averaging x,y components of individual vectors to determine average x,y components and therefore a direction representative of all individual vectors in a cluster may account for minor variations in trajectory caused by individual vectors. In other words, if slight variations in trajectory of vectors are considered to be "noise," averaging x,y components of such vectors may effectively cancel or at least reduce effects of such noise components.

Referring back to FIG. 9A, a third vector 915 generally points to the left-hand side of a section of electronic map 920, whereas first and second vectors 905 and 910 generally point to the right-hand side of the section of electronic map 920. Accordingly, contributions from third vector 915 may effectively cancel out large contributions from first and second vectors 905 and 910. To ensure that all vectors in a cluster 900 are pointing in the same general direction, the $Sa(\theta_1, \theta_2)$ relationship discussed above may be utilized to determine whether a direction of one or more vectors in cluster 900 needs to be changed.

To determine angle $\theta$ for a cluster vector, the following equation may be calculated for each of M individual vectors in a cluster to determine a sum S, where S represents an error estimate associated with angle $\theta$:

$$S = \sum_{i=1}^{M} \min\{sa2(\theta, \theta_i), sa^2(\theta + 180, \theta_i)\}$$

$\theta_i$ may represent a direction angle for each respective individual vector. The equation for S discussed above may be utilized to determine a value of $\theta$ that minimizes a measurement of least mean square error (LMSE). It should be appreciated that other measurements of error may be determined in some implementations. The equation may be utilized to determine which of the vectors to flip in direction. For example, the equation may be utilized to determine the directions for each vector that result in the smallest least mean square error and then the direction of vectors that are pointing in the other direction may be flipped.

A sum S may represent a measurement of error (e.g., LSME) and may be computed for all $\theta$ in a set such as {0, 1, 2, ..., 179}, as discussed above. A value of $\theta$ that minimizes a sum S may be identified and denoted $\theta_{min}$. For a particular individual vector, if $|\theta_{min} - \theta_i| > 90$, then an individual vector represented by $\theta_i$ may be determined to be pointed in a direction opposite of a majority of individual vectors in a cluster. Accordingly, a direction of the individual vector may effectively be flipped by adding 180 degrees to a value of $\theta_i$. $\theta_{min}$ may represent an angle of a cluster vector.

Referring back to FIG. 9A, first vector 905 may point in a direction at an angle $\theta_a$ with the horizontal, corresponding to 15.0° on a Cartesian grid reference, second vector 910 may point in a direction at an angle $\theta_b$ of 20.0°, and third vector 915 may point in a direction at an angle $\theta_c$ of 151.0°. If, for example, $\theta_{min}$ is calculated for vectors 905, 910, and 915 of cluster 900, $\theta_{min}$ may be calculated to have a value of 2.0° above the origin. A determination may be made regarding whether a value of $|\theta_{min} - \theta_i|$ is greater than 90.0°. In this case, values of $|\theta_{min} - \theta_i|$ for first vector 905 and second vector 910 are both less than 90.0°. However, a value of $|\theta_{min} - \theta_i|$ for third vector 915 is greater than 90.0°. In other words, |2.0°−151°| is 149.0°. Accordingly, 180 degrees may be added to third vector 915 to effectively flip its direction, as shown in FIG. 9B.

Figure 9B:
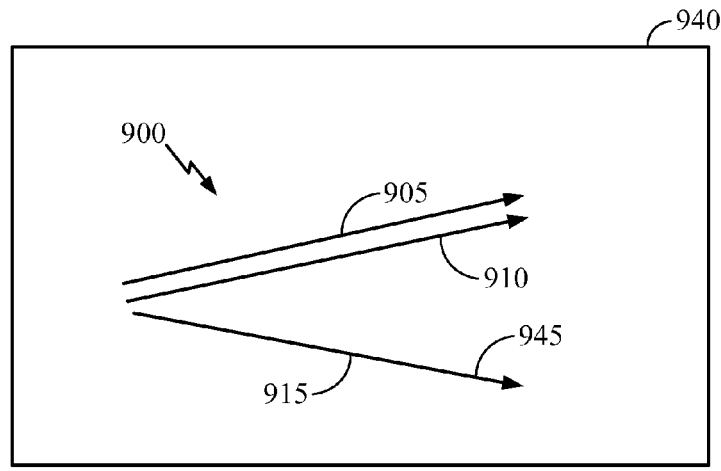

In FIG. 9B, a direction of third vector 915 is flipped. In other words, an arrow 945 on third vector 915 is placed on the opposing end from where arrow 925 was place in FIG. 9A. First vector 905 and second vector 910 may remain unchanged in portion of electronic map 940.

Figure 9C:
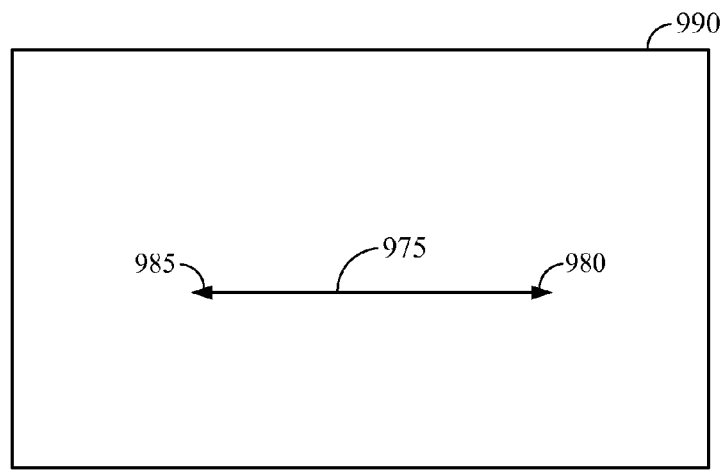

FIG. 9C illustrates a cluster vector 975 which may be formed by averaging individual vectors of cluster 900 as shown in FIG. 9B. Cluster vector 975 may point in a direction indicated by arrowhead 980. An arrowhead 985 may be added to an opposing end of cluster vector 975 to indicate that a person may move in opposing directions along a path within a corridor specified by cluster vector 975 shown in a portion of electronic map 990.

Figure 10:
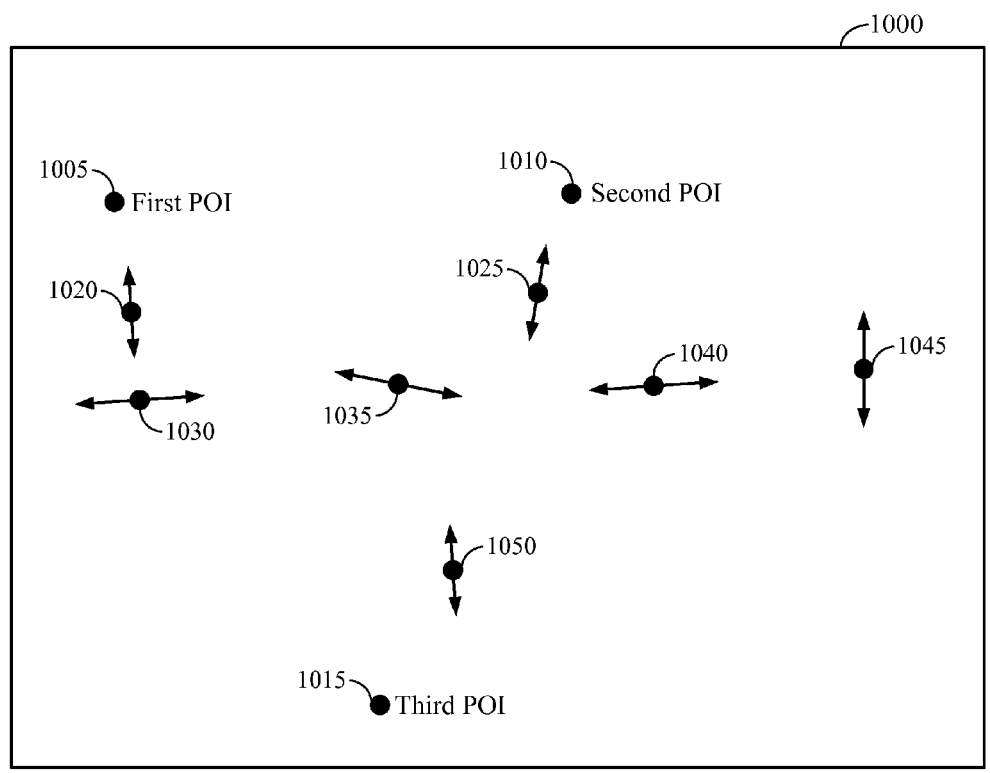
FIG. 10 illustrates derived points of interest (POIs) and cluster vectors in an electronic map according to one or more implementations.

FIG. 10 illustrates derived points of interest (POIs) and cluster vectors in an electronic map 1000 according to one or more implementations. As shown, electronic map 1000 shows a first POI 1005, a second POI 1010, and a third POI 1015. Electronic map 1000 also shows several cluster vectors, such as first cluster vector 1020, second cluster vector 1025, third cluster vector 1030, fourth cluster vector 1035, fifth cluster vector 1040, sixth cluster vector 1045, and seventh cluster vector 1050. Although electronic map 1000 does not show delineations of any walls or structural partitions other than an outside perimeter, a navigation application may utilize information shown in electronic map 1000 to route a user from a particular POI through one or more corridors indicated by cluster vectors and to a destination POI.

Figure 11:
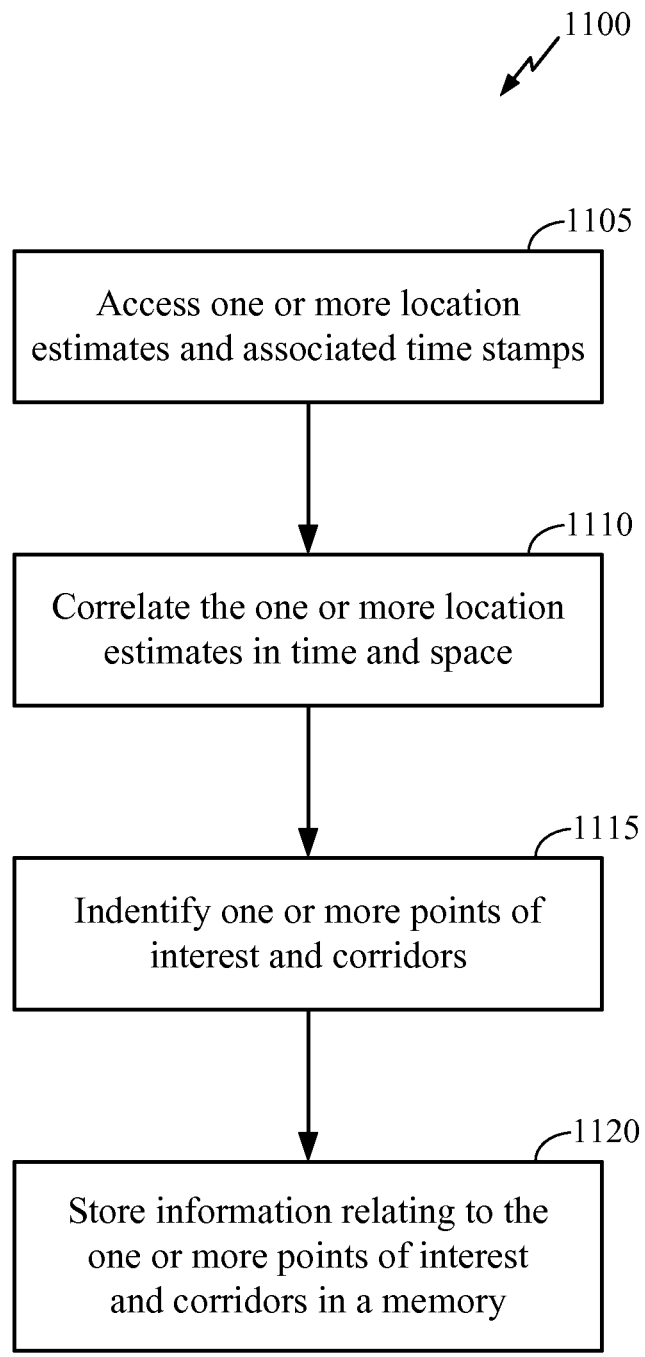
FIG. 11 is a flow diagram of a process for determining one or more points of interest and corridors according to one or more implementations.

FIG. 11 is a flow diagram of a process 1100 for determining one or more points of interest and corridors according to one or more implementations. At operation 1105, one or more location estimates and associated time stamps for one or more mobile devices within a predefined area may be accessed. Next, at operation 1110, one or more location estimates may be correlated in time and space to determine a first set of location estimates associated with one or more substantially stationary users and a second set of location estimates associated with one or more users in motion. At operation 1115, one or more points of interest may be identified within the predefined area based at least in part on the first set of location estimates and one or more corridors based at least in part on the second set of location estimates. At operation 1120, information relating to the one or more points of interest and the one or more corridors may be stored in a memory. The one or more location estimates may be associated with one or more time stamps.

Figure 12:
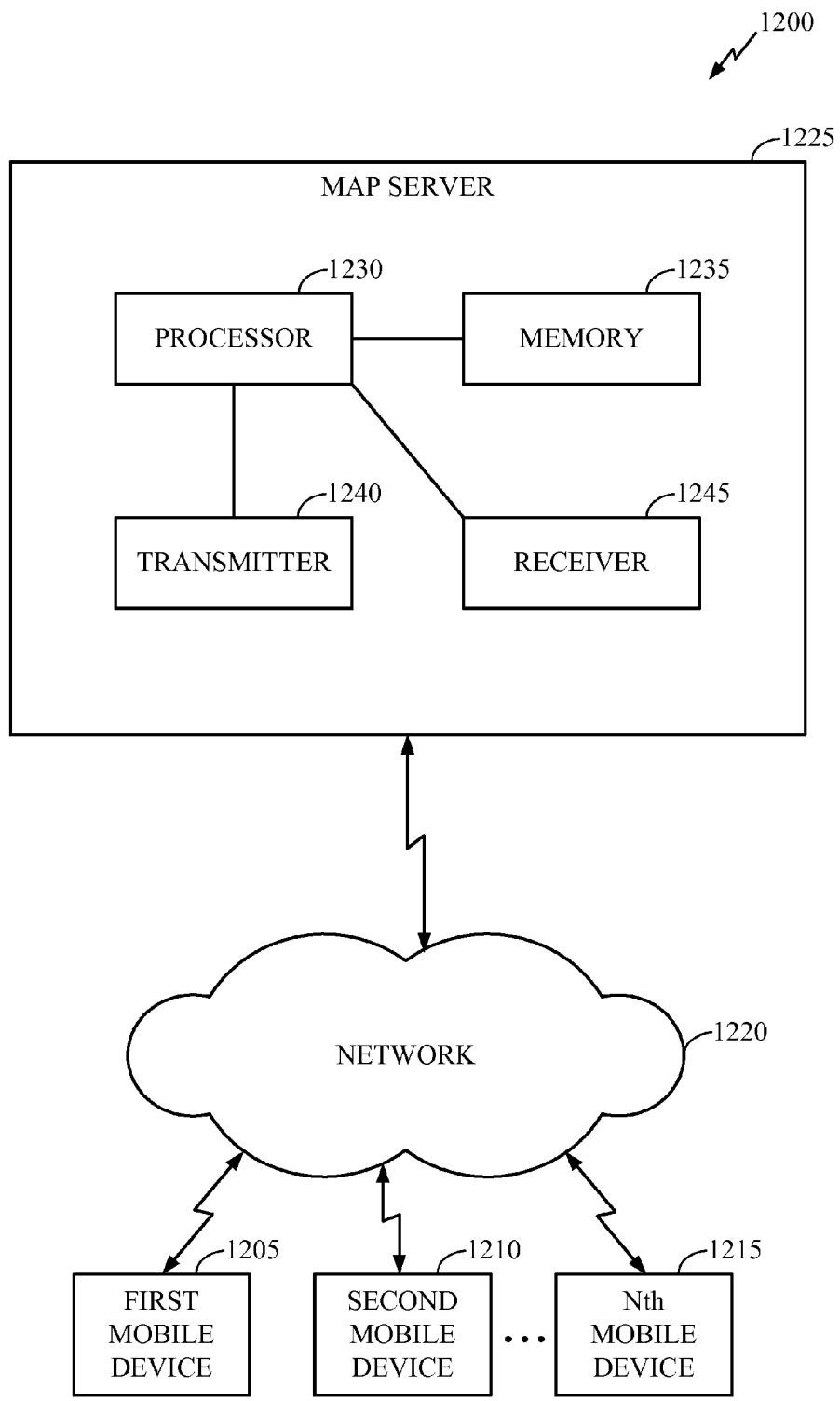
FIG. 12 is a schematic block diagram of a particular implementation of a system for inferring locations of map features according to one or more implementations.

FIG. 12 is a schematic block diagram of a particular implementation of a system 1200 for inferring locations of map features according to one or more implementations. System 1200 may comprises first mobile device 1205, second mobile device 1210, and additional mobile devices up through Nth mobile device 1215. Such mobile devices may transmit location estimates to a network 1220, such as the Internet. Network 1220 may allow for transmission of such location estimates to a map server 1225. Map server 1225 may be adapted to determine locations of one or more points of interest and/or corridors in an area based at least in part on received location estimates from mobile devices carried by users within the area.

Map server 1225 may include several elements such as a processor 1230, memory 1235, transmitter 1240, and receiver 1245. Memory 1235 may comprise a storage medium and may be adapted to store machine-readable instructions, which are executable to perform one or more of processes, examples, implementations, or examples thereof which have been described or suggested. Processor 1230 may be adapted to access and execute such machine-readable instructions. Through execution of these machine-readable instructions, processor 1230 may direct various elements of map server 1225 to perform one or more functions.

Memory 1235 may also store one or more electronic maps, annotations for such electronic maps, location estimates received from mobile devices of various users within a specified area, and other information relating to one or more points of interest and/or corridors, for example. Map server 1225 may receive location estimates and electronic maps via receiver 1245. Map server 1225 may transmit electronic maps and/or annotations for such electronic maps to a mobile device, for example, via transmitter 1240.

In one or more implementations, a server may transmit a message to a mobile device to request one or more location estimates from the mobile device. For example, if a server already has a sufficient amount of location estimates to determine corridors and/or points of interest in a certain portion of a mapped area, the server may not require any additional location estimates from mobile devices within such areas. If, for example, a server were to receive location estimates from thousands of mobile devices within a building, for example, substantial system bandwidth may be utilized to process all of these location estimates. In the event that sufficient location estimates for portions of a mapped area have already been received, utilizing system resources to process additional location estimates corresponding to a previously mapped area may be wasteful. On the other hand, there may be certain portions of an area for which additional location estimates may be utilized to further determine locations of one or more points of interest and/or corridors in less traveled areas. For example, if a section of a building had been recently remodeled resulting in a change to a layout of the section of the building, a server may not have sufficient information to determine locations of points of interest and/or corridors within such an area.

In some implementations, a human operator may transmit a message to a server to indicate that a particular portion of an area has been remodeled and that new mapping information should be determined for that area. In some other implementations, for example, a server may periodically request location estimates from mobile devices within certain areas or specified portions of the areas so that the server can determine on its own whether any points of interest and/or corridors within such area have been changed relative to the most recent mapping information available for such areas. For example, a server may transmit a message requesting location estimates from mobile devices within a certain proximity of certain coordinates or near one or more particular access points.

In one or more implementations, a server may transmit a message to one or more mobile devices requesting location estimates. A mobile device may receive such a message and may transmit its location estimate to such a server if the requirements of the request have been met such as, for example, the mobile device being within a certain area.

In some implementations, a mobile device may include certain motion sensors to detect motion of the mobile device. For example, a mobile device may include one or more "zero motion sensors." A "zero motion sensor," as used herein may refer to a sensor capable of detecting motion. In some embodiments, detected motion may be measured and compared to a non-zero threshold to determine if sufficient motion has occurred for the device to be considered in motion or substantially stationary. For example, examples of zero motion sensors used by a mobile device may include an accelerator, gyroscope, magnetometer, and/or a gravitometer. An accelerometer may detect acceleration of a mobile device and a gyroscope may detect a change in an orientation of the mobile device, for example. A magnetometer may measure a strength and/or direction of a magnetic field in the vicinity of the magnetometer, and a gravitometer may measure a local gravitational field of the Earth as observed by the gravitometer, for example. In some implementations, for example, images from a video camera on a mobile device may be processed to detect motion of the mobile device.

In some implementations, a mobile device may transmit sensor measurements in addition to location estimates to a server. A server may utilize such sensor measurements to determine whether a mobile device was in motion when a location estimate was determined. According to some implementations, as discussed above, a server may determine whether a mobile device was in motion at the time that location estimates were determined for the mobile device based at least in part on a distance between such location estimates. However, by factoring in additional information, such as sensor readings from the mobile device, a server may determine with a higher level of accuracy whether a mobile device was in motion at a time that one or more location estimates were determined. In some implementations, sensors readings alone may be utilized to determine whether a mobile device was in motion that the time that particular location estimates were determined.

In some implementations, a server may request that location estimates only be transmitted to the server if sensor readings for a mobile device indicate that the mobile device was in motion when the location estimates were determined. For example, a processor of a server may initiate transmission of a message via a transmitter, for example. Similarly, according to some implementations, a server may request that location estimates only be transmitted to the server if sensor readings for a mobile device indicate that the mobile device was stationary when the location estimates were determined.

According to some implementations, a server or other device may rank corridors in terms of a popularity index. A "popularity index," as used herein may refer to a measurement of a popularity of a particular corridor. A popularity index may be determined based at least in part on a number of individual vectors located within a particular corridor. For example, if a large number of individuals carry their mobile devices while moving along a particular corridor, a large number of individual vectors may be determined along the corridor based at least in part on successive location estimates for the mobile devices of such individuals. On the other hand, if a relatively small number of individuals carry their mobile devices while moving along a different corridor, a relatively small number of individual vectors may be determined along the corridor based at least in part on successive location estimates for the mobile devices of such individuals. Accordingly, if locations of corridors are known, the corridors may be ranked according to a popularity index based at least in part on a comparison of the number of individual vectors located along each of the corridors. A highly traveled corridor along which a large number of individuals travel may be associated with a relatively high popularity index, whereas a less traveled corridor along which a relatively small number of individuals travel may be associated with a relatively low popularity index.

In an office building, for example, individuals may prefer to walk along a particular corridor toward a building exit because there are vending machines or a bathroom aligned along the corridor. Information relating to a popularity index of such corridors may be utilized in a routing application. For example, more popular corridors are likely the preferred routes along which individuals prefer to travel within a building for a potential multitude of reasons. Accordingly, a server may analyze data from users in motion to determine which corridors within an area are associated with the largest number of motion vectors, for example, to rank such corridors.

Figure 13:
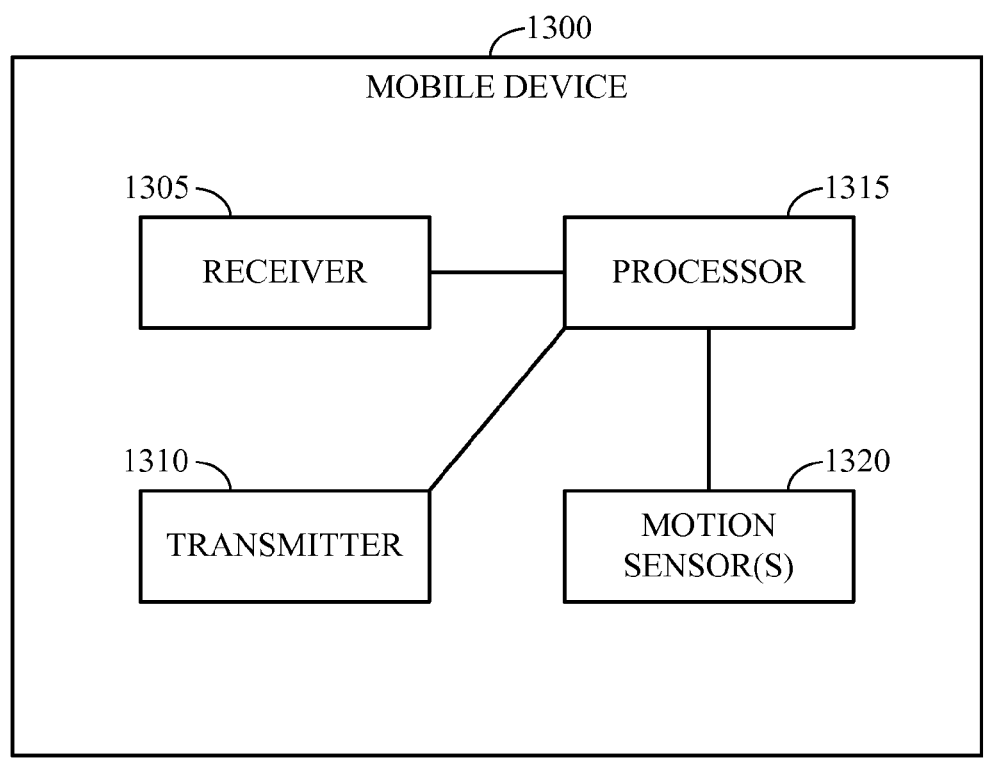
FIG. 13 is a schematic block diagram of a mobile device according to one or more implementations.

FIG. 13 is a schematic block diagram of a mobile device 1300 according to one or more implementations. As shown, mobile device 1300 may include several components, such as receiver 1305, transmitter 1310, processor 1315, and motion sensor(s) 1320. Receiver 1305 may receive one or more wireless signals from a network element, for example. Transmitter 1310 may transmit one or more wireless signals and may transmit one or more location estimates and/or other information, for example. Processor 1315 may perform various computations and/or may control operation of receiver 1305, transmitter 1310, and/or motion sensor(s) 1320. Motion sensor(s) 1320 may include one or more zero motion detectors to detect movement of mobile device 1300. In one or more implementations, motion sensor(s) 1320 may include an accelerator and/or a gyroscope to detect movement of mobile device 1300, for example.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the above discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, storage media, or other information storage devices, transmission devices, or display devices of the special purpose computer or similar special purpose electronic computing device. For example, a specific computing apparatus may comprise one or more processors programmed with instructions to perform one or more specific functions.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

For a firmware and/or hardware/software implementations, certain methodologies may be implemented with modules (e.g., procedures, functions, and so on) that perform the functions described herein. Any machine readable medium tangibly embodying instructions may be used in implementing the methodologies described herein. For example, software codes may be stored in a memory of a mobile station and/or an access point and executed by a processing unit of the device. Memory may be implemented within a processing unit and/or external to the processing unit. As used herein the term "memory" refers to any type of long term, short term, volatile, nonvolatile, or other memory and is not to be limited to any particular type of memory or number of memories, or type of media upon which memory is stored.

If implemented in hardware/software, functions that implement methodologies or portions thereof may be stored on and/or transmitted over as one or more instructions or code on a computer-readable medium. A computer-readable medium may take the form of an article of manufacture. A computer-readable medium may include computer storage media and/or communication media including any medium that facilitates transfer of a computer program from one place to another. A storage media may be any available media that may be accessed by a computer or like device. By way of example but not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing unit having a command set which includes the encoded commands. Such an instruction may be encoded in the form of a machine language understood by the processing unit. Again, these are merely examples of an instruction and claimed subject matter is not limited in this respect.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
    accessing two or more location estimates for two or more mobile devices within a predefined area;
    correlating the two or more location estimates in time and space to determine a set of location estimates for two or more mobile devices in motion;
    determining two or more vectors at least partially from the set of location estimates for the two or more mobile devices in motion, at least a first vector of the two or more vectors to be determined based, at least in part, on two or more successive location estimates for a first mobile device in motion of the two or more mobile devices in motion;

determining at least one cluster based, at least in part, on the two or more vectors;

identifying, by a processor, one or more corridors within the predefined area based at least in part on the at least one cluster; and storing at least one or more locations of the one or more corridors in a memory.

2. The method of claim 1, wherein individual ones of the two or more location estimates have corresponding time stamps.

3. A method comprising:

accessing one or more location estimates for one or more mobile devices within a predefined area, wherein individual ones of the one or more location estimates have corresponding time stamps;

correlating the one or more location estimates in time and space to determine a set of location estimates for the one or more mobile devices in motion;

identifying, by a processor, one or more corridors within the predefined area based at least in part on the set of location estimates;

storing at least one or more locations of the one or more corridors in a memory;

determining a distance between a first location estimate for a particular mobile device for an individual associated with a first time stamp and a second location estimate associated with a second time stamp; and determining whether the distance exceeds a predefined minimum threshold distance.

4. The method of claim 3, further comprising determining that the particular mobile device was in motion at times associated with the first location estimate and the second location estimate in response to the distance exceeding the predefined minimum threshold distance.

5. The method of claim 1, further comprising determining at least the first vector based at least in part on a distance between a first location estimate of the two or more successive location estimates and one or more subsequent location estimates for the first mobile device in motion.

6. The method of claim 1, further comprising grouping the two or more vectors into one or more clusters.

7. The method of claim 6, further comprising determining a magnitude and a direction of a cluster vector for at least one of the one or more clusters.

8. The method of claim 7, wherein the direction of the cluster vector is determined based at least in part on vector addition of the two or more vectors, the vector addition comprising flipping respective directions of at least one of the two or more vectors to account for movement of the two or more mobile devices in motion in opposing directions along the one or more corridors.

9. The method of claim 1, further comprising annotating one or more electronic maps associated with the predefined area to indicate at least one of the one or more corridors.

10. The method of claim 1, further comprising transmitting a message to the two or more mobile devices to request transmission of the two or more location estimates for the two or more mobile devices in response to determining the two or more mobile devices are located within a specified portion of the predefined area.

11. The method of claim 1, further comprising transmitting a message to the two or more mobile devices to request transmission of the two or more location estimates for the two or more mobile devices in response to two or more motion sensors of the two or more mobile devices-indicating that the two or more mobile devices are in motion.

12. A method comprising:

accessing one or more location estimates for one or more mobile devices within a predefined area;

correlating the one or more location estimates in time and space to determine a set of location estimates for the one or more mobile devices in motion;

identifying, by a processor, one or more corridors within the predefined area based at least in part on the set of location estimates;

storing at least one or more locations of the one or more corridors in a memory; and ranking the one or more corridors based at least in part on a popularity index of the one or more corridors among the one or more mobile devices in motion.

13. An apparatus, comprising:

a receiver to receive signals from a network;

a processor configured to:

access two or more location estimates for two or more mobile devices within a predefined area;

correlate the two or more location estimates in time and space to determine a set of location estimates for two or more mobile devices in motion;

determine two or more vectors at least partially from the set of location estimates for the two or more mobile devices in motion, at least a first vector of the two or more vectors to be determined based, at least in part, on two or more successive location estimates for a first mobile device in motion of the two or more mobile devices in motion;

determine at least one cluster based, at least in part, on the two or more vectors;

identify one or more corridors within the predefined area based at least in part on the at least one cluster; and store at least one or more locations of the one or more corridors in a memory.

14. The apparatus of claim 13, wherein the two or more location estimates are associated with two or more time stamps.

15. An apparatus, comprising:

a receiver to receive signals from a network;

a processor configured to:

access one or more location estimates for one or more mobile devices within a predefined area based at least in part on the signals, wherein individual ones of the one or more location estimates have corresponding time stamps;

correlate the one or more location estimates in time and space to determine a set of location estimates for the one or more mobile devices in motion;

identify one or more corridors within the predefined area based at least in part on the set of location estimates; and store at least one or more locations of the one or more corridors in a memory;

determine a distance between a first location estimate, having a first time stamp, for a particular mobile device for an individual and a second location estimate, having a second time stamp; and determine whether the distance exceeds a predefined minimum threshold distance.

16. The apparatus of claim 15, wherein the processor is adapted to determine that the particular mobile device was in motion at times associated with the first location estimate and the second location estimate in response to the distance exceeding the predefined minimum threshold distance.

17. The apparatus of claim 13, wherein the processor is adapted to determine the two or more vectors associated with the set of location estimates based at least in part on a distance between individual ones of the two or more location estimates and one or more successively determined location estimates for the two or more mobile devices in motion.

18. The apparatus of claim 17, wherein the processor is adapted to group two one or more vectors into one or more clusters.

19. The apparatus of claim 18, wherein the processor is adapted to determine a magnitude and a direction of a cluster vector associated with at least one of the one or more clusters.

20. The apparatus of claim 19, wherein the processor is adapted to determine the direction of the cluster vector based at least in part on vector addition of the two or more vectors, the vector addition comprising flipping respective directions of at least one of the two or more vectors to account for movement of the two or more mobile devices in motion in opposing directions along the one or more corridors.

21. An apparatus, comprising:
means for accessing two or more location estimates for two or more mobile devices within a predefined area;
means for correlating the two or more location estimates in time and space to determine a set of location estimates for two or more mobile devices in motion;
means for determining two or more vectors at least partially from the set of location estimates for the two or more mobile devices in motion, at least a first vector of the two or more vectors to be determined based, at least in part, on two or more successive location estimates for a first mobile device in motion of the two or more mobile devices in motion;
means for determining at least one cluster based, at least in part, on the two or more vectors;
means for identifying one or more corridors within the predefined area based at least in part on the at least one cluster; and
means for storing at least one or more locations of the one or more corridors.

22. The apparatus of claim 21, wherein the two or more location estimates are associated with one or more time stamps.

23. An apparatus comprising:
means for accessing one or more location estimates for one or more mobile devices within a predefined area, wherein individual ones of the one or more location estimates have corresponding time stamps;
means for correlating the one or more location estimates in time and space to determine a set of location estimates for the one or more mobile devices in motion;
means for identifying one or more corridors within the predefined area based at least in part on the set of location estimates;
means for storing at least one or more locations of the one or more corridors;
means for determining a distance between a first location estimate, having a first time stamp, for a particular mobile device for an individual and a second location estimate, having a second time stamp; and
means for determining whether the distance exceeds a predefined minimum threshold distance.

24. The apparatus of claim 23, further comprising means for determining that the particular mobile device was in motion at times associated with the first location estimate and the second location estimate in response to the distance exceeding the predefined minimum threshold distance.

25. An article, comprising:
a non-transitory storage medium comprising machine-readable instructions executable by a special purpose apparatus to:
access two or more location estimates for two or more mobile devices within a predefined area;
correlate the two or more location estimates in time and space to determine a set of location estimates for two or more mobile devices in motion;
determine two or more vectors at least partially from the set of location estimates for the two or more mobile devices in motion, at least a first vector of the two or more vectors to be determined based, at least in part, on two or more successive location estimates for a first mobile device in motion of the two or more mobile devices in motion;
determine at least one cluster based, at least in part, on the two or more vectors;
identify one or more corridors within the predefined area based at least in part on the at least one cluster; and
store at least one or more locations of the one or more corridors in a memory.

26. The article of claim 25, wherein the two or more location estimates are associated with one or more time stamps.

27. An article, comprising:
a non-transitory storage medium comprising machine-readable instructions executable by a special purpose apparatus to:
access one or more location estimates for one or more mobile devices within a predefined area, wherein individual ones of the one or more location estimates have corresponding time stamps;
correlate the one or more location estimates in time and space to determine a set of location estimates for the one or more mobile devices in motion;
identify one or more corridors within the predefined area based at least in part on the set of location estimates;
store at least one or more locations of the one or more corridors in a memory;
determine a distance between a first location estimate, having a first time stamp, for a particular mobile device for an individual and a second location estimate, having a second time stamp; and
determine whether the distance exceeds a predefined minimum threshold distance.

28. The article of claim 27, wherein the machine-readable instructions are further executable by the special purpose apparatus to determine whether the particular mobile device was in motion at times corresponding to the first time stamp and the second time stamp in response to the distance exceeding the predefined minimum threshold distance.

* * * * *